J. HINDS.
Scythe.
No. 1,772.
Patented Sept. 5, 1840.
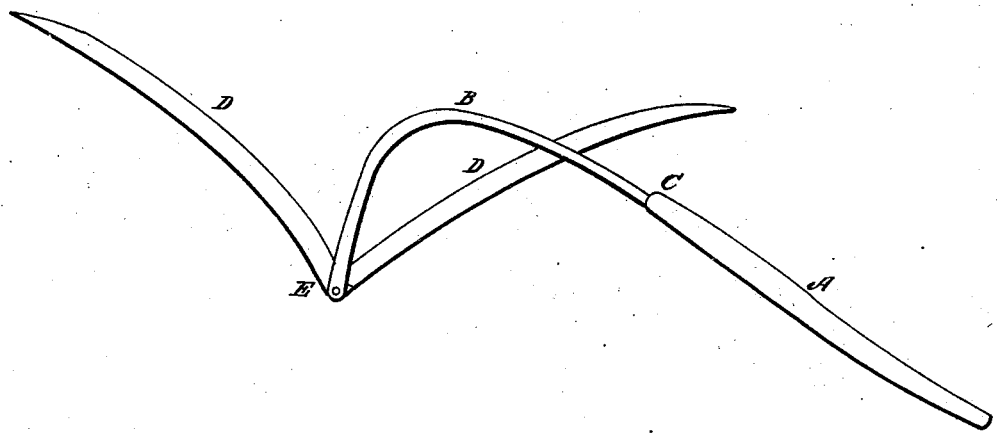
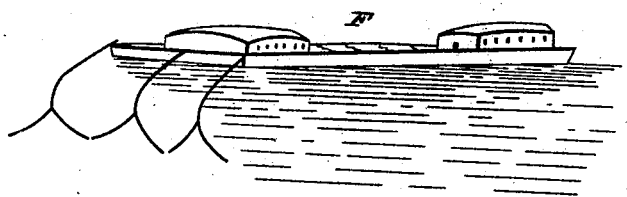
Witnesses:
Henry Burrell
John Bannerman
Inventor:
Jacob Hinds

UNITED STATES PATENT OFFICE.

JACOB HINDS, OF MURRAY, NEW YORK.

MACHINE FOR CUTTING GRASS UNDER WATER.

Specification forming part of Letters Patent No. 1,772, dated September 5, 1840.

*To all whom it may concern:*

Be it known that I, JACOB HINDS, of Murray, in the county of Orleans and State of New York, have invented a new and convenient machine for cleaning the bottoms of canals, rivers, bays, and harbors of grass and weeds growing therein by a new machine called the "Under-Water Grass-Cutter," without removing the water therefrom; and I do hereby declare that the following is a full and exact description.

The nature of my invention consists of two scythes fastened to a handle of sufficient length that while the scythes fall upon the ground a person standing upon the stern of a canal-boat may hold in his hand the handle of the instrument, and while the boat moves forward the scythe is drawn by the person and a swath six feet wide is made through the standing grass or weeds.

I shall here insert a more particular description of the instrument and the mode of using it in the annexed drawing. I take two scythes, five and one-half feet long, D D, and connect them together by a common shank, E, standing perpendicular to their flat surface, turning their sharpened edges outward, the heel ends of the scythes being united into the common shank E. The backs of these scythes D D are inclined to each other, forming an angle of about ninety degrees. An iron rod, B, is provided, cleft at the lower end for the space of four inches to receive the common shank E, above described, and these are fastened by two iron bolts with screws and nuts, for the convenience of exchanging or removing the scythes for repairs or sharpening. The iron rod B is gradually curved forward toward the points of the scythes, and inserted at C into a wooden handle, A, made longer or shorter to accommodate the depth of water in the canal.

In the use of the instrument an individual stands upon the stern of a boat, F, provided and used for that purpose, and holds the wooden handle A in his hands, while the scythes D D sink to the bottom, and as the boat is moved forward by horse or other power the instrument is drawn along, cutting a swath six feet in width.

To this instrument, for the sake of distinction, I give the name of "Under-Water Grass-Cutter."

I do not claim to be the inventor of the scythe; but

What I do claim is—

The connecting of two scythes at their heels and to a bar of iron, &c., for the purpose and in the manner described.

JACOB HINDS.

Witnesses:
 IRA CLARK,
 DAN H. COLE,
 A. HYDE COLE.